United States Patent
Kise et al.

(10) Patent No.: US 6,399,252 B1
(45) Date of Patent: *Jun. 4, 2002

(54) ELECTRODE, METHOD OF PRODUCING ELECTRODE, AND CELL COMPRISING THE ELECTRODE

(75) Inventors: Makiko Kise; Shoji Yoshioka; Jun Aragane; Hiroaki Urushibata; Hisashi Shiota; Hideo Horibe; Shigeru Aihara; Daigo Takemura, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/402,442

(22) PCT Filed: Jun. 25, 1998

(86) PCT No.: PCT/JP98/02854

§ 371 (c)(1),
(2), (4) Date: Dec. 27, 1999

(87) PCT Pub. No.: WO99/40640

PCT Pub. Date: Aug. 12, 1999

(30) Foreign Application Priority Data

Feb. 6, 1998 (WO) ................................. PCT/JP98/00488

(51) Int. Cl.[7] .......................... H01B 1/24; H01M 4/62; H01M 6/02
(52) U.S. Cl. ....................... 429/232; 429/221; 429/224; 252/511; 252/512
(58) Field of Search .................... 252/511, 512; 338/22 R; 429/221, 224, 232

(56) References Cited

U.S. PATENT DOCUMENTS

| | | | |
|---|---|---|---|
| 3,944,432 A | 3/1976 | Brinkmann et al. | |
| 4,416,915 A | 11/1983 | Palmer et al. | |
| 4,562,113 A | 12/1985 | Yonahara et al. | |
| 5,532,085 A | 7/1996 | Davis et al. | |
| 5,569,564 A | * 10/1996 | Swierbut et al. | ............ 424/224 |
| 5,599,644 A | 2/1997 | Swierbut et al. | |
| 5,643,480 A | 7/1997 | Gustavsson et al. | |
| 5,665,212 A | 9/1997 | Zhong et al. | |
| 5,705,259 A | 1/1998 | Mrotek et al. | |
| 5,856,773 A | 1/1999 | Chandler et al. | |
| 5,981,107 A | 11/1999 | Hamano et al. | |

FOREIGN PATENT DOCUMENTS

| | | | |
|---|---|---|---|
| EP | 851517 | * | 7/1998 |
| JP | 61-74257 | | 4/1986 |
| JP | 1-197963 | | 8/1989 |
| JP | 4-58455 | | 2/1992 |
| JP | 5-74493 | | 3/1993 |
| JP | 6-231749 | | 8/1994 |
| JP | 407161389 | * | 6/1995 |
| JP | 8-306354 | | 11/1996 |
| JP | 9-213305 | | 8/1997 |
| JP | 9-320604 | | 12/1997 |
| JP | 10-106516 | | 4/1998 |
| JP | 10-241665 | | 9/1998 |

* cited by examiner

*Primary Examiner*—Mark Kopec
(74) *Attorney, Agent, or Firm*—Oblon, Spivak, McClelland, Maier & Neustadt, P.C.

(57) ABSTRACT

An electrode for a battery which increases resistivity with increasing temperature. The electrode has an electron conductive material containing a conductive filler and a resin so as to increase its resistivity with increasing temperature. This solves the problem of the prior art where the battery temperature rises above a temperature at which the separator melts and flows due to an internal short circuit, with a large short circuit current being generated between the positive and negative electrodes at portions where the separator flows to cause heat generation to further increase the battery temperature. As a result, the short circuit current increases further.

17 Claims, 18 Drawing Sheets

FIG. 2

|  | VOLUME RESISTIVITY (Ω·cm) | RATE OF CHANGE OF RESISTIVITY | DISCHARGE CAPACITY (mAh) |
|---|---|---|---|
| EXAMPLE 1 | 100 | 50 | 4.3 |
| COMPARATIVE EXAMPLE 1 | 60 | 1.1 | 4.3 |

FIG. 5

| | VOLUME RESISTIVITY (Ω·cm) | RATE OF CHANGE OF RESISTIVITY WITH INCREASING TEMPERATURE | DISCHARGE CAPACITY (mAh) | TEMPERATURE OF BATTERIES AFTER 10 MINUTES FROM THE START OF A NAIL TEST (°C) |
|---|---|---|---|---|
| EXAMPLE 1 | 100 | 50 | 4.3 | 62 |
| COMPARATIVE EXAMPLE 3 | 521 | 112 | 1.1 | 55 |
| COMPARATIVE EXAMPLE 4 | 62 | 1.7 | 4.3 | 151 |

FIG. 8

|  | AVERAGE PARTICLE SIZE OF ELECTRON CONTDUCTIVE MATERIAL (μm) | VOLUME RESISTIVITY (Ω·cm) | DISCHARGE CAPACITY (mAh) |
|---|---|---|---|
| EXAMPLE 1 | 9.1 | 100 | 4.3 |
| COMPARATIVE EXAMPLE 5 | 52.3 | 932 | 2.8 |

FIG. 9

|  | POROSITY (%) | VOLUME RESISTIVITY (Ω·cm) | DISCHARGE CAPACITY (mAh) |
|---|---|---|---|
| EXAMPLE 1 | 30 | 100 | 4.3 |
| EXAMPLE 2 | 25 | 87 | 4.3 |

*FIG. 10*

|  | VOLUME RESISTIVITY (Ω·cm) | DISCHARGE CAPACITY (mAh) | BATTERY TEMPERATURE AFTER 10 MINUTES FROM THE START OF A NAIL TEST (°C) |
|---|---|---|---|
| EXAMPLE 1 | 100 | 4.3 | 62 |
| EXAMPLE 3 | 81 | 4.3 | 72 |

FIG. 11

| | PARTICLE SIZE OF ELECTRON CONDUCTIVE MATERIAL AFTER PULVERIZED BY A JET MILL METHOD (μm) |
|---|---|
| EXAMPLE 1 | 9.1 |
| EXAMPLE 4 | 5 |

FIG. 12

|  | PARTICLE SIZE OF ELECTRON CONDUCTIVE MATERIAL BEFORE PULVERING BY COMBINED METHOD (mm) | PARTICLE SIZE OF ELECTRON CONDUCTIVE MATERIAL AFTER PULVERING BY COMBINED METHOD ($\mu$m) |
|---|---|---|
| EXAMPLE 4 | 1 | 63 |
| EXAMPLE 5 | 1 | 49 |

FIG. 13

|  | VOLUME RESISTIVITY OF ELECTRODE (Ω·cm) | FLEXIBILITY OF ELECTRODE | SHORT-CIRCUIT CURRENT (A) |
|---|---|---|---|
| EXAMPLE 1 | 100 | △ | 0.3 |
| COMPARATIVE EXAMPLE 1 | 60 | △ | 13.2 |
| EXAMPLE 6 | 52 | ○ | 0.2 |

FIG. 14

|  | VOLUME RESISTIVITY OF ELECTRODE (Ω·cm) | FLEXIBILITY OF ELECTRODE | SHORT-CIRCUIT CURRENT (A) |
|---|---|---|---|
| EXAMPLE 1 | 100 | △ | 0.3 |
| COMPARATIVE EXAMPLE 1 | 60 | △ | 13.2 |
| EXAMPLE 7 | 59 | ○ | 0.2 |

FIG. 15

|  | VOLUME RESISTIVITY OF ELECTRODE (Ω·cm) | FLEXIBILITY OF ELECTRODE | SHORT-CIRCUIT CURRENT (A) |
|---|---|---|---|
| EXAMPLE 1 | 100 | △ | 0.3 |
| COMPARATIVE EXAMPLE 1 | 60 | △ | 13.2 |
| EXAMPLE 8 | 60 | △ | 0.2 |

FIG. 16

| | SHORT-CIRCUIT CURRENT (A) |
|---|---|
| EXAMPLE 9 | 0.3 |
| EXAMPLE 1 | 0.3 |

FIG. 17

| | SHORT-CIRCUIT CURRENT (A) |
|---|---|
| EXAMPLE 10 | 0.3 |
| EXAMPLE 1 | 0.3 |

ELECTRODE, METHOD OF PRODUCING ELECTRODE, AND CELL COMPRISING THE ELECTRODE

BACKGROUND OF THE INVENTION

This invention relates to an electrode, a process for producing the same, and a battery using the same. More particularly, it relates to an electrode which increases its resistivity with increasing temperature, a process for producing the electrode, and a battery having the electrode.

DISCUSSION OF THE BACKGROUND

With the recent development of electronic equipment, batteries used therein as a power source have increasingly gained in capacity and output density. A lithium ion secondary battery is attracting attention as a battery fulfilling these requirements. A lithium ion secondary battery has an advantage of high energy density but requires sufficient safety measures because of the use of a nonaqueous electrolytic solution.

Conventionally proposed safety measures include a safety valve which relieves inner pressure increases and a PTC element which increases resistivity on heat generation due to an external short-circuit to shut off the electric current. For example, incorporation of a safety valve and a PTC element into the cap of a positive electrode of a cylindrical battery is known as disclosed in JP-A-4-328278. However, on the safety valve's operation, moisture in the air enters the inside of the battery, which can induce an exothermic reaction in case lithium exists in the negative electrode.

On the other hand, a PTC element, which cuts off the circuit involving an external short, exerts no bad influence on operating. The PTC element can be designed to operate when the battery temperature rises to, for example, 90° C. or higher due to an external short-circuit so as to be a safety element which operates first in case of abnormality.

Having the above-mentioned constitution, conventional lithium secondary batteries have the following problems.

When a short-circuit occurs in the inside of a conventional lithium secondary battery to raise temperature, the battery is incapable of suppressing an increase of the short-circuit current.

When a short-circuit occurs in the inside of a lithium secondary battery to raise temperature, a separator made of polyethylene or polypropylene interposed between a positive electrode and a negative electrode is expected to soften or melt to clog the pores of the separator, whereby the separator would exude the nonaqueous electrolytic solution contained therein or seal the nonaqueous electrolytic solution within itself to reduce its ion conductivity thereby to diminish the short-circuit current. However, the part of the separator distant from the heat generating part does not always melt. Besides, in case temperature rises, it is likely that the separator melts and flows to lose its function of electric insulation between positive and negative electrodes, which can lead to a short-circuit.

Further, the negative electrode of a lithium ion secondary battery is prepared by coating a substrate functioning as a current collector, such as copper foil, with a slurry comprising a negative electrode active material such as graphite, a binder such as polyvinylidene fluoride (PVDF), and a solvent, drying the coating layer to form a film. The positive electrode is similarly prepared as a film on a substrate functioning as a current collector, such as aluminum foil.

The positive electrode contains an active material, such as $LiCoO_2$, a binder, and a conducting agent. The conducting agent is to enhance electron conductivity of the positive electrode in case where the active material has poor electron conductivity. The conducting agent includes carbon black (e.g., acetylene black) and graphite (e.g., KS-6).

When the temperature of such a battery increases over the temperature at which the separator melts and flows due to, e.g., an internal short-circuit, a large short-circuit current flows between the positive and negative electrodes at the part where the separator flows. It follows that the battery temperature further increases by heat generation, which results in a further increase of the short-circuit current.

SUMMARY OF THE INVENTION

The invention has been made in order to solve the above-described problem. An object of the invention is to provide an electrode which increases its resistivity with increasing temperature, a process for producing the electrode, and a battery.

DISCLOSURE OF THE INVENTION

A first electrode according to the invention is an electrode comprising an active material and an electron conductive material that is in contact with the active material, characterized in that the electron conductive material contains a conductive filler and a resin and is constituted so as to increase its resistivity with increasing temperature. According to this invention, since the electron conductive material contains a conductive filler and a resin and is constituted so as to increase its resistivity with increasing temperature, the electrode is capable of suppressing an increase of electric current when temperature rises.

A second electrode according to the invention is characterized in that the resin of the electron conductive material has a melting point of 90 to 160°. According to this embodiment, since a resin having a melting point of 90 to 160° C. is used in the electron conductive material, the electron conductive material increases its resistivity at around a predetermined temperature within a range of from 90 to 160° C.

A third electrode according to the invention contains 0.5 to 15 parts by weight of the electron conductive material. With the electron conductive material content ranging from 0.5 to 15 parts by weight, the electrode has a reduced resistivity before the rate of change of electrode resistivity increases.

A fourth electrode according to the invention is characterized in that the proportion of the conductive filler in the electron conductive material is 40 to 70 parts by weight. The conductive filler content in the electron conductive material ranging from 40 to 70 parts by weight, the electrode shows a high rate of change in resistivity at around a prescribed temperature, and a battery having the electrode has an increased discharge capacity.

A fifth electrode according to the invention is characterized in that the electron conductive material has a particle size of 0.05 to 100 μm. The particle size of the electron conductive material ranging from 0.05 to 100 μm, the electrode has a reduced resistivity before the rate of change of electrode resistivity increases, and a battery having the electrode has an increased discharge capacity.

A sixth electrode according to the invention is characterized in that the conductive filler is a carbon material or a conductive non-oxide. Containing a carbon material or a conductive non-oxide as a conductive filler, the electrode has enhanced conductivity.

A seventh electrode according to the invention is characterized by containing a conducting agent which is to increase electron conductivity and hardly changes its resistivity with temperature. Since the electrode contains a conducting agent which is to increase electron conductivity and hardly changes its resistivity with increasing temperature, the resistivity of the electrode can be properly adjusted even in using an electron conductive material having low electron conductivity.

An eighth electrode according to the invention is characterized by containing at least two different kinds of electron conductive materials. Because at least two electron conductive materials different in kind are used, there is provided a high flexible electrode having a low resistivity at temperatures lower than a prescribed temperature. When the inner temperature of a battery having the electrode increases above a prescribed value, the electrode increases its resistivity to reduce the current flowing inside the battery, thereby improving the safety of the battery.

A ninth electrode according to the invention is characterized in that the electron conductive material contains at least two different kinds of conductive fillers. Because at least two conductive fillers different in kind are used, there is provided a high flexible electrode having a low resistivity at temperatures lower than a prescribed temperature. When the inner temperature of a battery having the electrode increases above a prescribed temperature, the electrode increases its resistivity to reduce the current flowing inside the battery, thereby improving the safety of the battery.

A tenth electrode according to the invention is characterized in that the electron conductive material contains at least two different kinds of resins. Because at least two resins of different kinds are used, there is provided an electrode having a low resistivity at temperatures lower than a prescribed temperature. When the inner temperature of a battery having the electrode increases above a prescribed temperature, the electrode increases its resistivity to reduce the current flowing inside the battery, thereby improving the safety of the battery.

An eleventh electrode according to the invention is characterized in that the active material is a cobalt-containing oxide. The active material being a cobalt-containing oxide, a battery having the electrode has a reduced current in case of a short-circuit.

A twelfth electrode according to the invention is characterized in that the active material is a manganese-containing oxide. The active material being a manganese containing oxide, a battery having the electrode has a reduced current in case of a short-circuit.

A thirteenth electrode according to the invention is characterized in that the active material is an iron-containing oxide. The active material being an iron-containing oxide, a battery having the electrode has a reduced current in case of a short-circuit.

A fourteenth electrode according to the invention is characterized in that the resin is a crystalline resin. According to this embodiment, the rate of change of resistivity at around a predetermined temperature is increased by using a crystalline resin.

A first battery according to the invention comprises a positive electrode, a negative electrode, and an electrolytic solution provided between the positive and the negative electrodes, characterized in that the positive or negative electrode is any one of the above-described first to fourteenth electrodes. According to this structure, since the positive or negative electrode is any one of the above-described first to fourteenth electrodes, the electrode increases its resistivity when the temperature inside the battery increases above a predetermined temperature. As a result, the current flowing inside the battery is diminished, thereby bringing about improved safety.

A first process for producing an electrode according to the invention is characterized by comprising the steps of
(a) pulverizing an electron conductive material containing a conductive filler and a resin,
(b) dispersing the pulverized electron conductive material and an active material to prepare active material paste, and
(c) pressing the active material paste having being dried at a prescribed pressing temperature under a prescribed pressure.

Comprising the steps (a) to (c), the process secures good connections among the particles of the electron conductive material so that the resistivity of the electrode at temperatures lower than a prescribed temperature can be reduced.

A second process for producing an electrode according to the invention is the first process characterized in that the prescribed temperature is the melting point of the resin or thereabouts. By setting the prescribed temperature at or around the melting point of the resin, the connections among the electron conductive material particles are further improved so that the resistivity of the electrode at temperatures lower than the prescribed temperature can be reduced further.

A third process for producing an electrode according to the invention is the first process characterized in that the step of pulverizing an electron conductive material containing a conductive filler and a resin is carried out by making the electron conductive material to collide with a wall or with each other in an ultrasonic stream. The electron conductive material can be pulverized into small particles by collision with a wall or with each other in an ultrasonic stream. An electrode produced by using the thus pulverized electron conductive material has further reduced resistivity at temperatures lower than a prescribed temperature.

A fourth process for producing an electrode according to the invention is the first process characterized in that the step of pulverizing an electron conductive material containing a conductive filler and a resin is carried out by applying a combination of shear force, frictional force, and impact force to the electron conductive material. The electron conductive material can be pulverized into particles with reduced size variation by applying a combination of shear force, frictional force, and impact force to the electron conductive material. An electrode produced by using the thus pulverized electron conductive material has high flexibility and is therefore easy to fabricate.

A fifth process for producing an electrode according to the invention is the fourth process characterized in that the electron conductive material is pulverized under cooling. In this embodiment, an electron conductive material with further reduced size variation can be obtained by carrying out the pulverization while cooling. An electrode produced by using the thus pulverized electron conductive material has still higher flexibility and is therefore still easier to fabricate.

BRIEF DESCRIPTION DRAWING

FIG. 2 is a table showing volume resistivity and rate of change of resistivity of electrodes and discharge capacity of batteries.

FIG. 5 is a table showing volume resistivity and rate of change of resistivity with temperature of electrodes, discharge capacity of batteries, and battery temperature after 10 minutes from the start of a nail test.

FIG. 8 is a table showing average particle size of electron conductive materials, resistivity of electrodes, and discharge capacity of batteries.

FIG. 9 is a table showing porosity and volume resistivity of electrodes and discharge capacity.

FIG. 10 is a table showing volume resistivity of electrodes, discharge capacity of batteries, and battery temperature after 10 minutes from the start of a nail test.

FIG. 11 is a table showing average particle size of electron conductive materials used in an electrode.

FIG. 12 is a table showing particle size of electron conductive materials before being pulverized by a combined method and one after being pulverized by a combined method.

FIG. 13 is a table showing volume resistivity of electrodes, flexibility of electrodes, and short-circuit current of batteries.

FIG. 14 is a table showing volume resistivity of electrodes, flexibility of electrodes, and short-circuit current of batteries.

FIG. 15 is a table showing volume resistivity of electrodes, flexibility of electrodes, and short-circuit current of batteries.

FIG. 16 is a table showing short-circuit current of batteries.

FIG. 17 is a table showing short-circuit current of batteries.

DETAILED DESCRIPTION OF THE PREFERRED EMBODIMENTS

Figure 1:
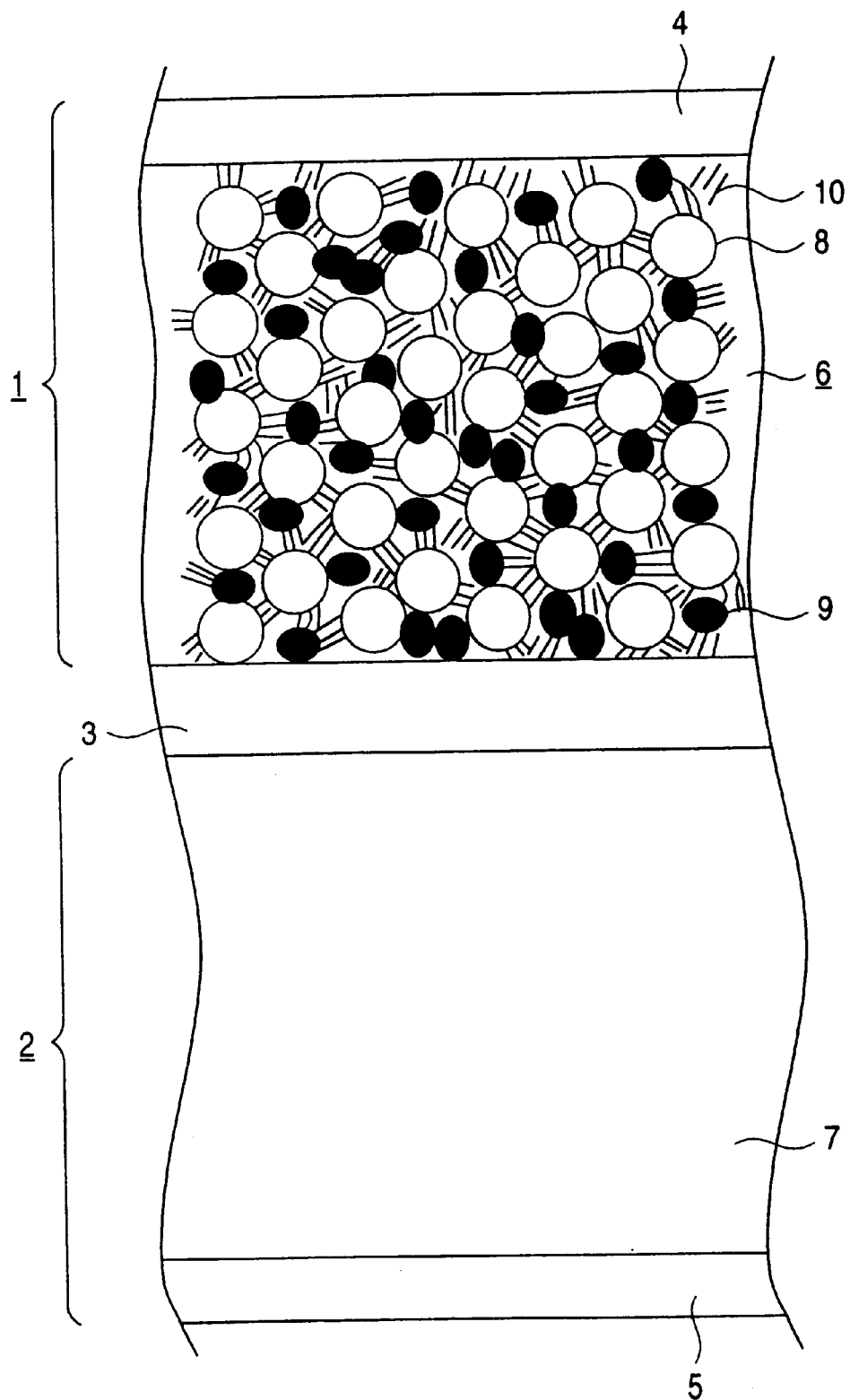
FIG. 1 is an illustration for explaining a battery structure.

FIG. 1 is an illustration for explaining the structure of the battery according to the invention. More specifically, it is a cross-sectional view of the battery. In FIG. 1, numerals 1, 2, and 3 indicate a positive electrode, a negative electrode, and a separator interposed therebetween, respectively. The positive electrode 1 has a positive electrode current collector 4 and a positive electrode active material layer 6. The negative electrode 2 has a negative electrode current collector 5 and a negative electrode active material layer 7. The positive electrode 1 is composed of a metal film (e.g., an aluminum film), which functions as the current collector 4, and the active material layer 6 formed thereon. The negative electrode 2 is composed of a metal film (e.g., a copper film), which serves as the current collector 5, and the active material layer 7 which is molded of a negative electrode active material such as carbon particles with a binder. The separator 3 holds an electrolytic solution containing, for example, lithium ions. The positive electrode active material layer 6 comprises a positive electrode active material 8, an electron conductive material 9, and a binder 10.

The positive electrode active material 8 includes a cobalt-containing oxide, a manganese-containing oxide, and an iron-containing oxide. The cobalt-containing oxide includes $LiCoO_2$ crystals and $LiCoO_2$ crystals with part of the Co atoms thereof displaced with transition metal atoms (e.g., Ni atoms, Mn atoms, etc.). The manganese-containing oxide includes $LiMnO_2$, $LiMn_2O_4$, and $LiM_yMn_2\text{-}yO_4$ (M: Cr, Co, Ni, etc.). The iron-containing oxide includes $LiFeO_2$, $Li_5FeO_4$, and $Fe_2(SO_4)_3$.

Since the positive electrode active material 8 and the electron conductive material 9 are bound together with the binder 10, they are in parts in contact with each other. The active material 8 is particulate. The electron conductive material 9 is also particulate, having a smaller size than the active material 8. The electron conductive material 9 comprises, for example, a conductive filler and a resin.

The electron conductive material 9 has the property of increasing its resistivity with increasing temperature. In particular, it exhibits PTC characteristics. The change of resistivity becomes sharp at a prescribed temperature or thereabouts within a range of from 90° to 160° C. to show an increased resistivity (the characteristics will hereinafter be referred to PTC (positive temperature coefficient) function).

The conductive filler includes, for example, carbon materials and conductive non-oxides. The carbon material includes carbon black, graphite, and carbon fiber. The carbon black includes acetylene black, furnace black, lamp black, thermal black, and channel black. The conductive non-oxide includes metal carbides, metal nitrides, metal silicides, and metal borides. The metal carbides include TiC, ZrC, VC, NbC, TaC, $Mo_2C$, WC, $B_4C$, and $Cr_3C_2$. The metal nitrides include TiN, ZrN, VN, NbN, TaN, and $Cr_2N$. The metal borides include $TiB_2$, $ZrB_2$, $NbB_2$, $TaB_2$, CrB, MoB, and WB.

The resin includes high-density polyethylene (melting point: 130 to 140°), low-density polyethylene (melting point: 110 to 112° C.), a polyurethane elastomer (melting point: 140–160° C.), and polyvinyl chloride (melting point: about 145° C.). The melting point of these resins is in a range of from 90° to 160° C.

Because the temperature at which the PTC function is activated is dependent on the melting point of the resin contained in the electron conductive material 9, the temperature at which the PTC function is manifested can be set within a range of from 90° to 160° C. by selecting the material or kind of the resin to be used in the electron conductive material 9. Where a crystalline resin is used in the electron conducive material 9, the rate of change of resistivity at about the temperature at which the PTC function of the electron conductive material 9 is exerted can further be increased.

The PTC characteristics may be reversible so that the function could be performed twice or more times or may be irreversible so that a temperature drop after manifestation of the PTC function is not followed by restoration of the initial resistivity.

If the electron conductive material performs its PTC function lower than 90° C., which is favorable for security, the electrode would increase its resistivity under a usual temperature condition for using a battery. This will lead to reduction of battery performance, such as load rate characteristics. If the temperature for manifestation of the PTC function exceeds 160° C., the inner temperature of a battery rises up to that temperature, which is unfavorable for safety. Accordingly, it is desirable that the electron conductive material 9 be designed to manifest the PTC function at a temperature ranging from 90° to 160° C. Because the temperature at which the PTC function is activated is dependent on the melting point of the resin, the resin is selected from those having a melting point within a range of from 90° to 160° C.

The resistivity of the electrode in its normal state (i.e., before the PTC function is activated) can be controlled by varying the proportion of the electron conductive material 9 in the positive electrode active material layer 6.

The electron conductive material 8 performs its PTC function through the mechanism that the resin contained softens, melts, and expands to raise the resistivity of the electron conductive material 9. In the positive electrode 1 of the battery according to the invention, since the electron conductive material 9 contained in the active material layer 6 has the PTC function, the active material layer 6 increases its resistivity when the temperature of the positive electrode 1 exceeds a value at which the electron conductive material 9 exerts its PTC function. Therefore, where an electrode having such characteristics is used in a battery (in this particular explanation where it is used as a positive electrode 1), the positive electrode active material layer 6 itself increases its resistivity to suppress the electric current in the inside of the battery in case the electric current should increase due to an external or internal short-circuit to cause a rise of battery or electrode temperature above a certain point. A battery assembled by using the above-mentioned electrode will have markedly improved safety, being kept safe even in case of abnormalities, such as a short-circuit under strict conditions, a back charge, and an overcharge.

While the positive electrode active material layer 6 has been described with reference to an embodiment in which it is made up of the active material 8, the electron conductive material 9, and the binder 10, it is by no means limited to this particular embodiment. For example, where the positive electrode active material 6 contained in the positive electrode active material layer 6 is of a material having insufficient electron conductivity, the insufficiency can be compensated for by addition of a conducting agent to the active material layer 6.

Further, the electron conductive material 9 can be fibrous or flaky as well as particulate. In other words, the shape of the electron conductive material 9 is not at all limited as long as it is of such size that can be positioned among the particles of the active material 8.

While the constitution of the electron conductive material containing a conductive filler and a resin has been described with reference to the positive electrode 1, especially the active material layer 6, it is not limited thereto. That is, the above constitution can be applied to the negative electrode 2 to produce similar effects.

The following gives an example of a process for preparing the positive electrode 1, an example of a process for preparing the negative electrode 2, and an example of a process for producing a battery having the positive electrode 1 and the negative electrode 2.

Process for Preparing Positive Electrode:

An electron conducting material whose volume resistivity is sufficiently low at room temperature but high at temperatures above a prescribed value within a range of from 90° to 160° C. (e.g., pellets comprising a conductive filler and a resin in a prescribed ratio) is pulverized to prepare fine particles of the electron conductive material.

Methods for pulverizing an electron conductive material include a method using compressed air or compressed inert gas (e.g., nitrogen or argon), which can be embodied as follows. An ultrasonic stream of the above-mentioned gas is generated, and the particulate electron conductive material is carried in the stream to collide with each other or with a wall (not shown) to be pulverized into fine particles of small diameter (this mode will be referred to as a jet mill method). In particular, in order to obtain an electron conductive material having a small particle size, it is desirable that an electron conductive material be pulverized by a jet mill method.

Another method for pulverizing an electron conductive material comprises applying a combination of shear force, frictional force, and impact force to the electron conductive material. This method is embodied by, for example, pulverizing an electron conductive material by means of uneven blades of a spinning rotor (not shown) and a stator (not shown) to obtain fine particles of the electron conductive material (this method will be referred to as a combined method). Still another method for pulverizing an electron conductive material comprises shearing an electron conductive material in a rotating ball mill (this method will be referred to as a ball mill method).

In particular, fine particles of an electron conductive material having a small particle size and reduced variation of particle size can be obtained by pulverizing the electron conductive material by a combined method or a ball mill method and further pulverizing the resulting powder by a jet mill method. Further, where pulverization of the electron conductive material is carried out while cooling, the resulting particles have a further reduced size.

The resulting fine particles of an electron conductive material, a positive electrode active material (e.g., $LiCoO_2$), and a binder (e.g., PVDF) are dispersed in a dispersing medium (e.g., N-methylpyrrolidone, hereinafter abbreviated as NMP) to prepare a positive electrode active material paste. The resulting paste is applied to a current collector substrate (e.g., a metal film of prescribed thickness) which serves as a positive electrode current collector 4. After drying, the coating layer is pressed at a prescribed temperature under a prescribed planar pressure to form a positive electrode active material layer 6 having a desired thickness to obtain a positive electrode 1.

According to the above-described process for producing an electrode (more specifically a positive electrode 1), since the dried paste is pressed at a prescribed temperature under a prescribed planar pressure, the current collector 4 and the active material layer 6 have improved adhesion to each other to reduce the contact resistance between the current collector 4 and the active material layer 6. Further, the particles of the electron conductive material 9 are satisfactorily connected to each other to form many current collecting networks, which reduces the resistivity of the active material layer 6 in its normal state. It follows that the resistivity of the electrode in its normal state is reduced.

In other words, the resistivity of an electrode prepared can be controlled by adjusting the temperature and pressure (planar pressure) in pressing the electrode. In particular, where the prescribed pressing temperature is set at the melting point of the resin contained in the electron conductive material 9 or thereabouts, the adhesion between the current collector 4 and the active material layer 6 is further improved to further reduce the contact resistance between the current collector 4 and the active material layer 6.

Further, the electron conductive material 9 can deform and enter the interstices among active material particles, and the connection among the electron conductive material particles 9 is also improved. It follows that more current collecting networks are provided to further reduce the resistivity of the electrode in its normal state.

While the embodiment in which a dried positive electrode active material paste is pressed at a prescribed temperature under a prescribed planar pressure has been explained, the positive electrode 1 can also be obtained by pressing a dried positive electrode active material paste under a prescribed planar pressure, followed by heating at a prescribed temperature (desirably the melting point or thereabouts).

A process for producing the negative electrode 2 of the battery according to the invention will be described.

Process for Preparing Negative Electrode:

A negative electrode active material paste prepared by dispersing mesophase carbon microbeads (hereinafter abbreviated as MCMB) and PVDF in NMP is applied to a current collector substrate (e.g., a metal film of prescribed thickness) which serves as a negative electrode current collector, dried, and pressed at a prescribed temperature under a prescribed pressure to obtain a negative electrode 2 having a negative electrode active material layer 7.

A process for producing the battery according to the invention will be described.

Process for Producing Battery:

The positive and the negative electrodes prepared above are joined together with a separator (e.g., a porous polypropylene sheet) interposed therebetween, and an electrolytic solution is supplied to obtain a battery having a pair of electrodes. The battery thus obtained has the property of increasing its resistivity with an increase in temperature. In case a short-circuit should occur outside or inside the battery to raise the battery temperature, the battery suppresses an increase of the short-circuit current thereby securing improved safety.

EXAMPLE 1

Process for preparing positive Electrode:

An electron conductive material having a volume resistivity of 0.2 Ω·cm at room temperature and of 20 Ω·cm at 135° C. (e.g., pellets containing 60 parts by weight of carbon black and 40 parts by weight of polyethylene) was finely ground by a jet mill method to prepare fine particles of the electron conductive material.

Six parts by weight of the fine particles, 91 parts by weight of a positive electrode active material (e.g., $LiCoO_2$), and 3 parts by weight of a binder (e.g., PVDF) were dispersed in NMP, a dispersing medium, to prepare a positive electrode active material paste.

The paste was applied to a 20 $\mu$m thick metal film (aluminum foil) serving as a positive electrode current collector 4 by a doctor blade coating method, dried at 80° C., and pressed at a prescribed temperature (e.g., room temperature) and under a prescribed planar pressure (e.g., 2 ton/cm$^2$) to obtain a positive electrode 1 having a positive electrode active material layer 6 about 100 $\mu$m thick on the current collector 4.

Process for Preparing Negative Electrode:

A negative electrode active material paste prepared by dispersing 90 parts by weight of mesophase carbon microbeads (hereinafter abbreviated as MCMB) and 10 parts by weight of PVDF in NMP was applied to 20 $\mu$m thick copper foil, a negative electrode current collector, by a doctor blade coating method, dried at 80° C., and pressed at room temperature under a pressure of 2.0 ton/cm$^2$ to obtain a negative electrode 2 having a negative electrode active material layer 7 on the current collector 5.

Evaluation of Electrode and Battery:

The electrode of the invention and the battery having the same were evaluated in accordance with the following methods.

Measurement of Resistivity of Electrode:

Aluminum foil was fusion bonded to both sides of the electrode. A voltage and a current terminal of plus side were connected to one side of the electrode, and those of minus side to the other side. The terminal was equipped with a heater. A constant current was made to flow while heating the electrode at a rate of 5° C./min, and a reduction in voltage was measured to determine the resistivity (volume resistivity; Ω·cm).

Capacity Test:

The positive electrode 1 and the negative electrode 2 prepared above, both cut to a size of 14 mm×14 mm, were joined with a porous polypropylene sheet (Cell Guard #2400, produced by Hoechst) interposed therebetween as a separator 3 to prepare an electrode body. A current collecting tab was spot welded to each of the positive electrode current collector 4 and the negative electrode current collector 5, and the electrode body was put in a bag made of an aluminum laminate sheet. An electrolytic solution prepared by dissolving lithium hexafluorophosphate in a 1:1 (by mole) mixed solvent of ethylene carbonate and diethyl carbonate in a concentration of 1.0 mol/dm$^3$ was poured into the bag, and the opening of the bag was heat-sealed to complete a battery.

The resulting battery was subjected to a charge and discharge test at room temperature to measure the discharge capacity at 2C (C: hour rate).

Nail Test:

The positive electrode 1 and the negative electrode 2 prepared above were both cut in sizes of 50 mm×50 mm. A cut piece of the positive electrode 1 and a cut piece of the negative electrode 2 were joined with a porous polypropylene sheet (Cell Guard #2400, produced by Hoechst) interposed therebetween as a separator 3 to prepare a unit electrode body. Ten unit electrode bodies were piled one on top of another, and a current collecting tab was connected to the end of every positive electrode current collector 4 and every negative electrode current collector 5 and spot-welded among the positive electrodes and among the negative electrodes to electrically connect the unit electrode bodies in parallel to form a laminated battery body. The laminated battery body was put in a bag made of an aluminum laminate sheet. An electrolytic solution prepared by dissolving lithium hexafluorophosphate in a 1:1 (by mole) mixed solvent of ethylene carbonate and diethyl carbonate in a concentration of 1.0 mol/dm$^3$ was put in the bag, and the opening of the bag was heat-sealed to complete a battery.

The resulting battery was charged at 800 mA to 4.2 V at room temperature. After completion of charging, an iron nail 2.5 mm in diameter was stuck into the center of the battery, and the battery temperature was measured.

FIG. 2 is a table showing the characteristics of the electrode and the battery having the electrode, specifically, a table showing volume resistivity and rate of change of volume resistivity of the electrodes (positive electrodes) of Example 1 and Comparative Example 1 and discharge capacity of batteries having the electrode of Example 1 and Comparative Example 1.

The positive electrode of Comparative Example 1 shown in the Figure was prepared in the same manner as for the positive electrode of Example 1 except for using artificial graphite KS-6 (produced by LONZA Ltd.) as an electron conductive material. The negative electrode of Comparative Example 1 was prepared in the same manner as for the negative electrode of Example 1.

In the Figure, the rate of change of resistivity is the quotient obtained by dividing the volume resistivity after manifestation of the PTC function by the volume resistivity before the manifestation.

It can be seen from the Figure that Comparative Example 1, in which the electron conductive material contains no resin, has a smaller rate of change of resistivity than Example 1. It is also seen that Comparative Example 1 and Example 1 are almost equal in discharge capacity. Because the electrode of Example 1, specifically the active material layer 6 of the positive electrode 1 comprises the electron conductive material 9 containing a resin, the resistivity after manifestation of the PTC function is as high as 50 times the resistivity before the manifestation. Accordingly, in case the inner temperature of the battery using the electrode should increase above a prescribed temperature, the PTC function is performed to suppress an increase of the short-circuit current. The safety and reliability of the battery are thus improved.

While the rate of change of resistivity of the electrode illustrated in Example 1 is 50, the rate of change of resistivity is not limited thereto. The above-mentioned effects can be produced with the rate of change of resistivity ranging from about 1.5 to 10000.

Figure 3:
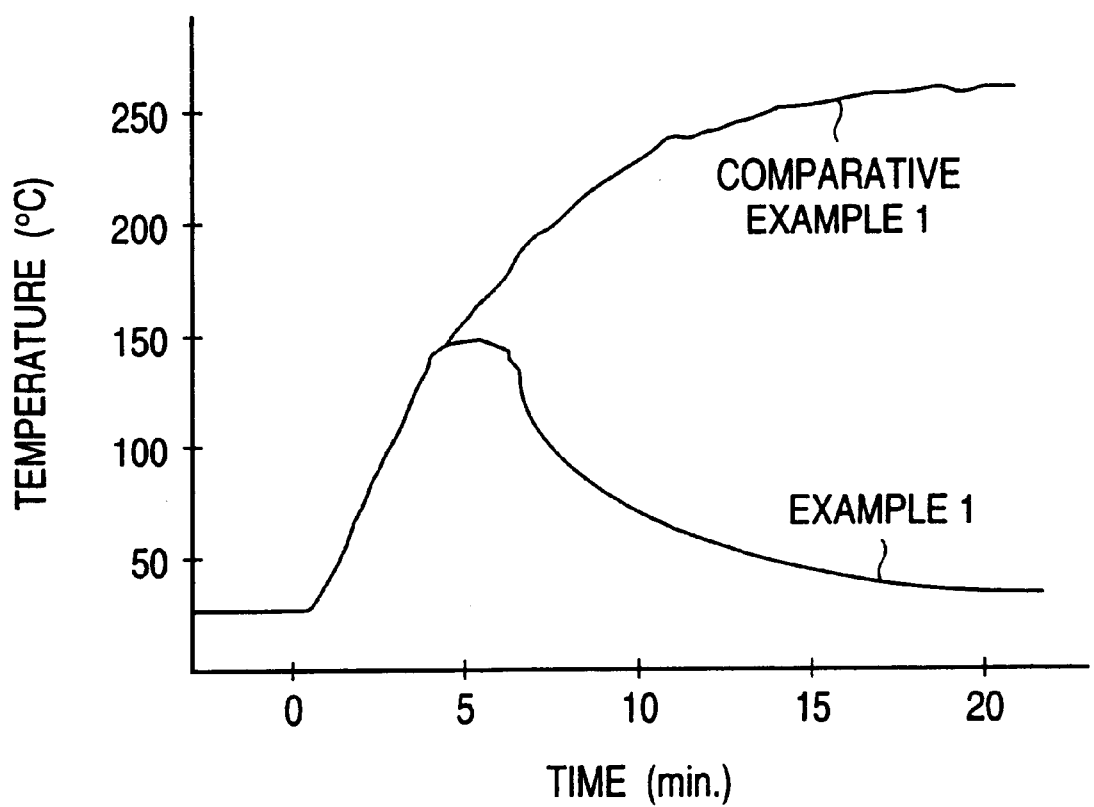
FIG. 3 is a graph showing the relationship of battery temperature against passage of time in a nail test.

FIG. 3 is a graph showing the characteristics of the battery having the electrode, specifically the relationship of battery temperature against passage of time in the nail test carried on the battery having the electrode of Example 1 and the battery having the electrode of Comparative Example 1. After the temperature having reached to about 150° C., the battery having the electrode of Example 1 begins to its temperature drop within 5 minutes because it activates the PTC function when its temperature rises up to about a prescribed temperature; whereas the battery having the electrode of Comparative Example 1 continues increasing its temperature with time. Compared with Comparative Example 1, the electrode of Example 1, particularly the active material layer 6 of the positive electrode 1 has a resin mixed into the electron conductive material 9. The battery assembled by using the electrode manifests the PTC function when the battery inner temperature becomes higher than a prescribed temperature. As a result, before the battery temperature exceeds 160° C., a further increase in short-circuit current can be suppressed thereby securing the safety and reliability of the battery.

Figure 4:
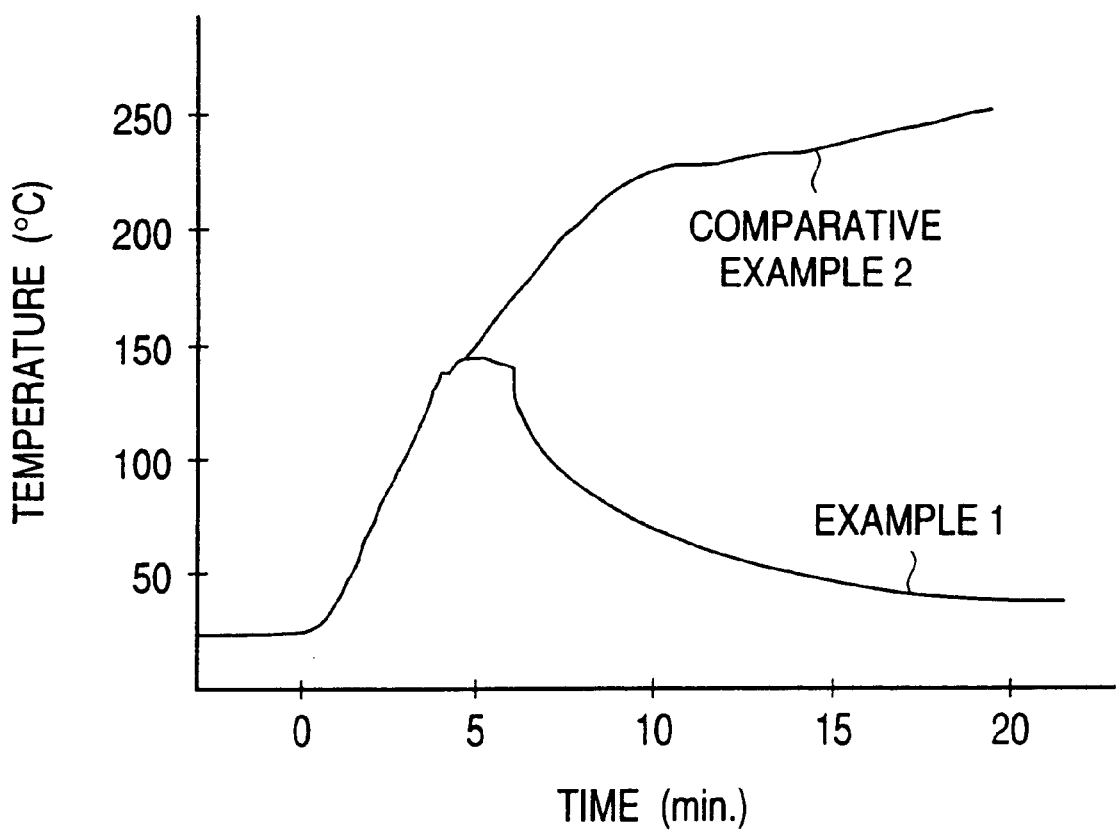
FIG. 4 is a graph showing the relationship of battery temperature against passage of time in a nail test.

FIG. 4 is a graph showing the characteristics of the battery having the electrode, specifically the relationship between battery temperature and passage of time in the nail test carried on the battery having the electrode of Example 1 and the battery having the electrode of Comparative Example 2. The positive electrode of Comparative Example 2 shown in the Figure was prepared in the same manner as for the positive electrode of Example 1 except for using pellets containing carbon black and a polypropylene resin (melting point: 168° C.) as an electron conductive material 9. The negative electrode used in Comparative Example 2 was prepared in the same manner as in Example 1.

As shown in the Figure, it seems that the battery of Comparative Example 2 activates the PTC function at a temperature exceeding 160° C., for the electron conductive material 9 used therein contains a polypropylene resin whose melting point is 168° C. On the other hand, in Example 1 where polyethylene whose melting point is lower than 160° C. is used as a resin, an increase in short-circuit current is suppressed before the battery temperature exceeds 160° C. thereby securing improved safety and reliability of the battery.

The battery having the electrode of Example 1 performs the PTC function on temperature rise so that the temperature begins to fall after it reaches about 150° C. To the contrary, the battery having the electrode of Comparative Example 2 manifests the PTC function at a high temperature so that the temperature keeps rising even after reaching 200° C. This is because the resin contained in the electron conductive material (i.e., polypropylene resin) has a melting point higher than 160° C.

Accordingly, the temperature at which the PTC function is activated can be lowered than 160° C. without inducing reduction of battery performance by selecting the resin to be contained in the electron conductive material 9 from among those having a melting point between 90° and 160° C.

FIG. 5 is a table showing the characteristics of electrodes and batteries having each of the electrodes, specifically volume resistivity and rate of change of resistivity with increasing temperature of electrodes, discharge capacity of batteries at 2C (C: hour rate), and battery temperature after 10 minutes from the start of a nail test. In Comparative Example 3, an electrode (positive electrode 1) was prepared in the same manner as for the positive electrode of Example 1 except for using pellets comprising 38 parts by weight of carbon black and 62 parts by weight of polyethylene as an electron conductive material 9, and a battery was prepared by using the electrode. The negative electrode of Comparative Example 3 was prepared in the same manner as in Example 1. In Comparative Example 4, an electrode (positive electrode 1) was prepared in the same manner as for the positive electrode of Example 1 except for an electron conductive material comprising 71 parts by weight of carbon black and 29 parts by weight of polyethylene, and a battery was prepared by using the electrode. The negative electrode of Comparative Example 4 was prepared in the same manner as in Example 1.

As shown in the Figure, Comparative Example 3 shows a greater rate of change of resistivity than Example 1 but has a higher electrode resistivity, resulting in a lower discharge capacity. Although Comparative Example 4 has a higher discharge capacity than Example 1, it has an insufficient PTC function because of too large a carbon black content. As a result, the battery temperature became very high after 10 minutes from the start of the nail test.

Accordingly, it is possible to properly set the rate of change of electrode resistivity and the discharge capacity of a battery by varying the proportion of the conductive filler in the electron conductive material 9.

In particular, with the proportion of the conductive filler in an electrode (positive electrode 1 in this example) ranging from 40 to 70 parts by weight, it is feasible not only to increase the rate of change of electrode resistivity while minimizing the resistivity of the electrode in its normal state (i.e., before manifestation of the PTC function) but also to obtain an increased discharge capacity from a battery assembled by using the electrode. The characteristics of the electrode and the battery shown in FIG. 5 can further be improved by using the conductive filler in the electron conductive material in a proportion of 50 to 68 parts by weight.

Figure 6:
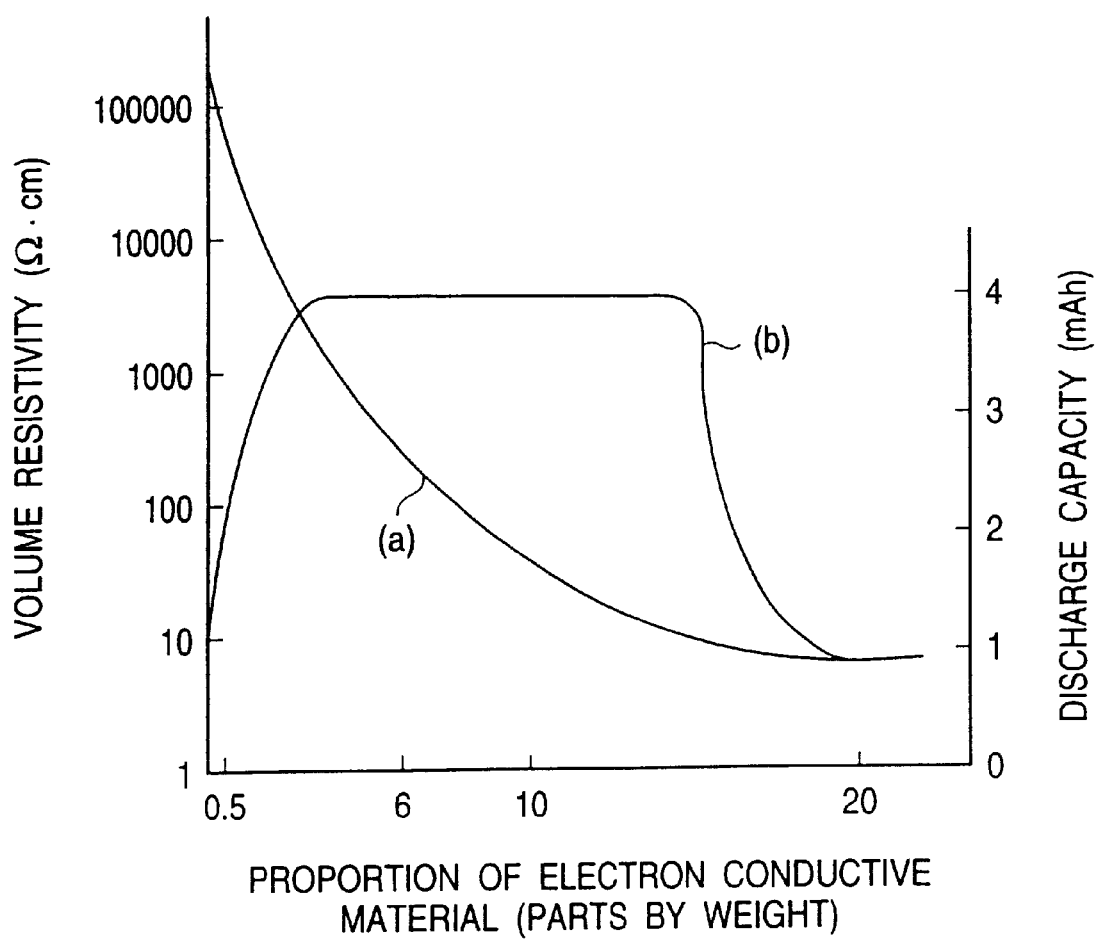
FIG. 6 is a graph showing the relationship between the proportion of an electron conductive material and the resistivity of an electrode and the relationship between the proportion of an electron conductive material and discharge capacity.

FIG. 6 is a graph showing the characteristics of the electrode and the battery having the electrode, specifically the relationship between the proportion of the electron conductive material and the volume resistivity of the electrode and the relationship between the proportion of the electron conductive material and the discharge capacity. More specifically it shows the relationship between the proportion of the electron conductive material per 100 parts by weight of the total solids content of the positive electrode active material layer of the battery and the volume resistivity of the electrode (curve (a)) and the relationship between the proportion of the electron conductive material per 100 parts by weight of the total solids content of the positive electrode active material layer of the battery and the discharge capacity of the battery (curve (b)).

As shown in the Figure, where the proportion of the electron conductive material 9 is less than 0.5 parts by weight, the electrode itself has too high a resistivity in its normal state only to provide a low discharge capacity, which is problematical from the standpoint of battery performance. Where the proportion is more than 15 parts by weight, the amount of the active material is diminished, also resulting in a reduction of discharge capacity. Accordingly, it is possible to reduce the resistivity of an electrode in the normal state and also to increase the discharge capacity of a battery having the electrode by using the electron conductive material 9 in a proportion of from 0.5 to 15 parts by weight in the electrode. It is still preferred for further improving the above-described characteristics that the electron conductive material be used in a proportion of 0.7 to 12 parts by weight, particularly 1 to 10 parts by weight, per 100 parts by weight of the total solids content of the electrode (positive electrode in this example).

Figure 7:
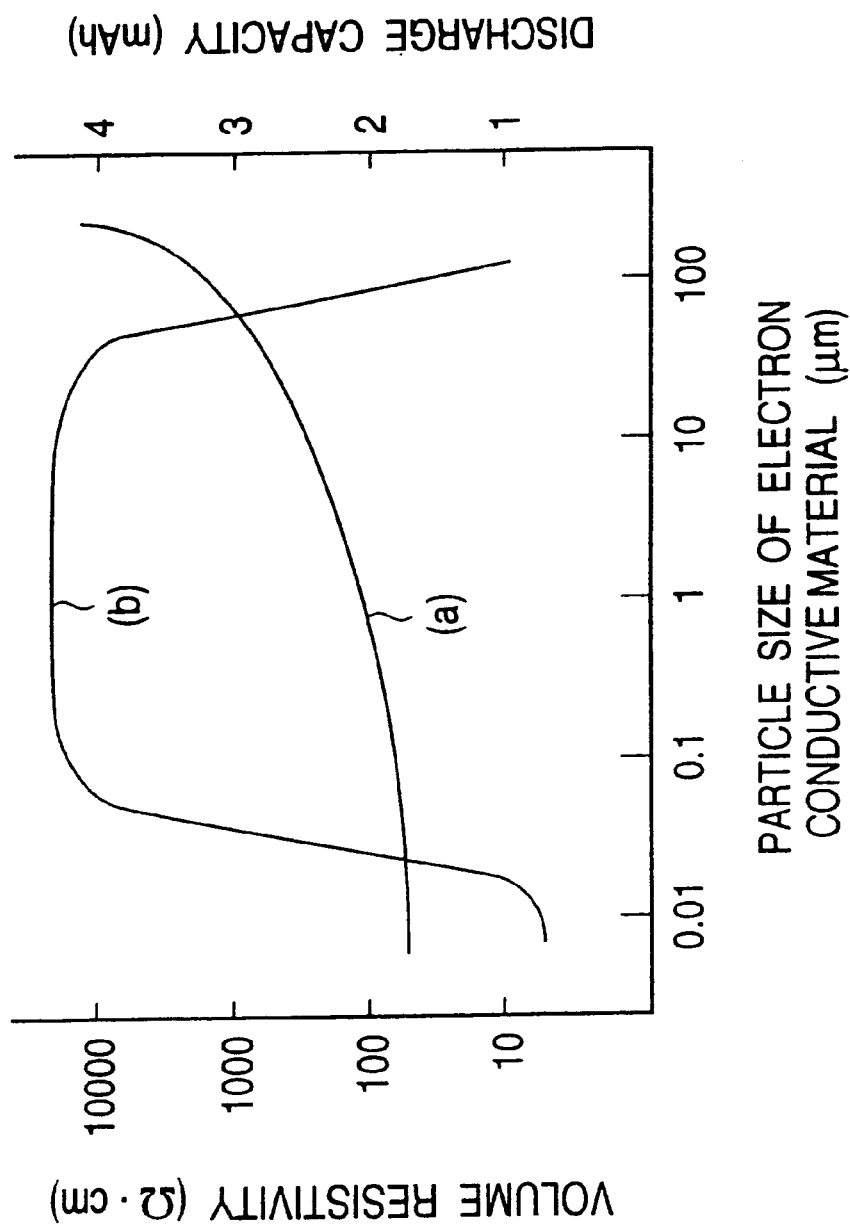
FIG. 7 is a graph showing the relationship between the particle size of an electron conductive material and the volume resistivity of an electrode and the relationship between the particle size of an electron conductive material and discharge capacity.

FIG. 7 is a graph showing the relationship between the particle size of an electron conductive material and the volume resistivity of an electrode (curve (a) ) and the relationship between the particle size of an electron conductive material and discharge capacity (curve (b)). Where the electron conductive material 9 has a particle size of smaller than 0.05 $\mu$m, the packing density of smaller than the electron conductive material 9 reduces, resulting in an increase of the electron conductive material 9 in volume per unit volume of the positive electrode active material layer 6. This means that the weight of the positive electrode active material per unit volume of the active material layer 6 reduces. As a result, if the particle size of the electron conductive material 9 is smaller than 0.05 $\mu$m, the discharge capacity reduces. On the other hand, where the particle size of the electron conductive material 9 is greater than 100 $\mu$m, the electrode itself has a high resistivity, and the discharge capacity reduces as a result.

Accordingly, it is possible to reduce the resistivity of an electrode in the normal state to obtain an increased discharge capacity by using an electron conductive material 9 having an average particle size of 0.05 to 100 $\mu$m. The volume ratio of the electron conductive material 9, the volume resistivity of the electrode, and the discharge capacity can further be improved by using an electron conductive material 9 having an average particle size of 0.1 to 50 $\mu$m, particularly 0.5 to 20 $\mu$m.

FIG. 8 is a table showing average particle size of electron conductive materials, resistivity of electrodes, and discharge capacity of batteries. In Comparative Example 5 shown in the table, the electrode (positive electrode 1) was prepared by using the electron conductive material pulverized by a ball mill method, and the negative electrode was prepared in the same manner as in Example 1. In Comparative Example 5, since the electron conductive material was pulverized by a ball mill method, the resulting electron conductive material 9 had a large average particle size. It follows, as can be seen, that the electrode had a high volume resistivity, and the discharge capacity was small. It is therefore desirable for the electron conductive material to be pulverized by a jet mill method in order to make the resistance of the electrode in the normal state lower and to make the discharge capacity of the battery higher.

EXAMPLE 2

Example 2 is characterized in that the electrode (positive electrode 1) was prepared in the same manner as in Example 1, except that the positive electrode active material paste was applied on aluminum foil, dried at 80° C., and pressed at 135° C. under a pressure of 0.5 ton/cm$^2$ for 30 minutes. The negative electrode was prepared in the same manner as in Example 1. The characteristics of the resulting electrode and the battery having the electrode are shown in FIG. 9.

Because in Example 2 the dried paste is pressed at around the melting point of the resin contained in the electron conductive material 9, the adhesion between the current collector 4 and the active material layer 6 is improved thereby to reduce the contact resistance between the current collector 4 and the active material layer 6 as shown in the Figure. Further, the particles of the electron conductive material 9 deform and spread among the particles of the active material 8, while improving connections among themselves. It follows that more current collecting networks are provided to further reduce the resistivity of the active material layer 6 in its normal state. As a result, the resistivity of the electrode (positive electrode 1) in the normal state can further be diminished. This means that the resistivity of an electrode can be controlled by adjusting the temperature and pressure (planar pressure) in pressing the dried active material paste. In particular, where the pressing temperature is set at the melting point of the resin contained in the electron conductive material or thereabouts, reduction in volume resistivity of the electrode in the normal state can be secured even though the pressing pressure is somewhat lowered because the pressing is carried out at around the melting point of the resin.

EXAMPLE 3

Preparation of Positive Electrode:

An electron conductive material having a volume resistivity of 0.2 •·cm at room temperature and of 500 •·cm at a working temperature of 135° C. (e.g., pellets comprising carbon black and polyethylene in a prescribed ratio) was pulverized by a jet mill method to prepare fine particles of the electron conductive material having an average particle size of 9.0 $\mu$m.

Four-point-five parts by weight of the fine particles, 1.5 parts by weight of artificial graphite KS-6 (produced by LONZA Ltd.) as a conducting agent, 91 parts by weight of an active material (e.g., LiCoO$_2$), and 3 parts by weight of a binder (e.g., PVDF) were dispersed in NMP, a dispersing medium, to prepare a positive electrode active material paste.

The paste was applied to a 20 $\mu$m thick metal film (aluminum foil) serving as a positive electrode current collector 4 by a doctor blade coating method, dried at 80° C., and pressed at a prescribed temperature (e.g., room temperature) and under a prescribed planar pressure (e.g., 2 ton/cm$^2$) to obtain a positive electrode 1 having a positive electrode active material layer 6 about 100 $\mu$m thick on the current collector 4.

The negative electrode of Example 3 was prepared in the same manner as in Example 1.

FIG. 10 is a table showing the characteristics of electrodes and batteries using each electrode, specifically the volume resistivity of the electrode of Example 1, the discharge capacity of a battery having the electrode of Example 1, the temperature of the battery after 10 minutes from the start of a nail test, the volume resistivity of the electrode of Example 3, the discharge capacity of a battery having the electrode of Example 3, and the temperature of the battery after 10 minutes from the start of a nail test.

Compared with Example 1, the electrode of Example 3 is almost equal to Example 1 in discharge capacity. That is, even where an electron conductive material having a high volume resistivity is used, the volume resistivity of the electrode in its normal state can be decreased by addition of a conducting agent to provide a battery with a high discharge capacity. While the conducting agent used here is graphite (artificial graphite KS-6 produced by LONZA Ltd.), the conducting agent to be used is not limited thereto. Any substance that increases electron conductivity of an electrode and undergoes little change in resistivity with temperature (or any substance that increases electron conductivity and has no PTC function), such as carbon black, e.g., acetylene black or lamp black, can be used as a conducting agent.

EXAMPLE 4

Example 4 is characterized in that the positive electrode was prepared in the same manner as in Example 1, except that the electron conductive material was ground by a combined method and then further pulverized by a jet mill method. The negative electrode of Example 4 was prepared in the same manner as in Example 1.

FIG. 11 is a table showing average particle size of the electron conductive material used in the electrode (positive electrode 1) of Example 4. It is seen that the average particle size of Example 4 is smaller than in Example 1. Since the electron conductive material is reduced in size by a combined pulverizing method and then further pulverized by a jet mill method, the resulting particles of the electron conductive material have a reduced particle size with reduced variation of particle size, and the time required for pulverization can be shortened. Accordingly, an electrode prepared by using the resulting electron conductive material is highly flexible and easy to fabricate.

While Example 4 has been described with particular reference to the positive electrode, the same can be applied to the negative electrode to produce similar effects.

EXAMPLE 5

Example 5 is characterized in that the positive electrode was prepared in the same manner as in Example 4, except that the electron conductive material was pulverized by a combined method while cooling. The negative electrode of Example 5 was prepared in the same manner as in Example 1.

FIG. 12 is a table showing particle size of electron conductive materials before being pulverized by a combined method and one after being pulverized by a combined method. According to the Figure, it is seen that the electron conductive material particles obtained by a combined method while cooling the material have a smaller particle size than those obtained without cooling. By carrying out pulverization of the electron conductive material while cooling, the particle size and variation of particle size of the resulting electron conductive material can further be reduced, and an electrode having further improved flexibility and easier to fabricate can be obtained.

EXAMPLE 6

The electrode of Example 6 is characterized by having at least two kinds of electron conductive materials. Example 6 will be illustrated with reference to an embodiment in which the active material layer 6 of the positive electrode 1 has two kinds of electron conductive materials. In the following are described a process for preparing the positive electrode and a process for preparing the negative electrode used in Example 6.

Process for Preparing Positive Electrode:

A first electron conductive material (e.g., pellets containing 70 parts by weight of carbon black and 30 parts by weight of polyethylene) was pulverized by a jet mill method to prepare fine particles of the first electron conductive material.

A second electron conductive material (e.g., pellets containing 90 parts by weight of tungsten carbide and 10 parts by weight of polyethylene) was pulverized by a jet mill method to prepare fine particles of the second electron conductive material.

Then, 4.2 parts by weight of the first electron conductive material particles, 1.8 parts by weight of the second electron conductive material particles, 91 parts by weight of a positive electrode active material (e.g., $LiCoO_2$), and 3 parts by weight of a binder (e.g., PVDF) were dispersed in NMP, a dispersing medium, to prepare a positive electrode active material paste.

The paste was applied to a 20 $\mu$m thick metal film (aluminum foil) which served as a positive electrode current collector 4 by a doctor blade coating method, dried at 80° C., and pressed at a prescribed temperature (e.g., room temperature) under a prescribed planar pressure (e.g., 2 ton/cm$^2$) to obtain a positive electrode 1 having a positive electrode active material layer 6 about 100 $\mu$m thick on the current collector 4.

The negative electrode of Example 6 was prepared in the same manner as in Example 1.

The resulting electrode and a battery prepared by using the electrode were tested as follows to confirm their performance.

Short-circuit Test:

The positive electrode 1 and the negative electrode 2 prepared above, both cut to a size of 38 mm×65 mm, were joined together with a polypropylene sheet (Cell Guard #2400, produced by Hoechst) interposed therebetween as a separator 3. The electrodes with the separator 3 were sandwiched in between a pair of Teflon plates about 1 mm thick and fixed with adhesive tape. A current collecting tab was attached to the end each of the positive electrode current collector 4 and the negative electrode current collector 5 by ultrasonic welding. The resulting electrode body was put in a bag made of an aluminum laminate sheet. An electrolytic solution prepared by dissolving lithium hexafluorophosphate in a 1:1 (by mole) mixed solvent of ethylene carbonate and diethyl carbonate in a concentration of 1.0 mol/dm$^3$ was put in the bag, and the opening of the bag was heat-sealed to complete a battery.

The resulting battery was charged at room temperature at 80 mA to 4.2 V. After completion of charging, the battery was put in an oven and heated to cause a short-circuit at 145° C., at which the short-circuit current was measured.

FIG. 13 is a table showing the characteristics of the electrode and the battery having the same, specifically the volume resistivity of the electrode, the flexibility of the electrode, and the short-circuit current of the battery having the electrode. In the Figure, circles indicate considerably good flexibility, and triangles indicate moderately good flexibility.

It is seen from the Figure that Example 6 has a lower volume resistivity, higher flexibility and a lower short-circuit current than Comparative Example 1. Accordingly, an electrode having a lower resistivity at temperatures below a prescribed temperature and higher flexibility and easier to fabricate can be obtained by using at least two kinds of electron conductive materials in the active material layer thereof (positive electrode active material layer 6 of the positive electrode 1). The electrode provides a battery of high safety because, in case of an external or internal short-circuit accompanied by a rise of the battery temperature, the short-circuit current flowing inside the battery is reduced.

While Example 6 has been described with reference to the particular case where two electron conductive materials were used, the present invention is not limited thereto. What is important is that the above-mentioned effects can be produced by using a plurality of electron conductive materials in the electrode.

EXAMPLE 7

The electrode of Example 7 is characterized in that the electron conductive material used therein contains at least two kinds of electron conductive fillers. Description will be made with a particular embodiment in which the electron conductive material 9 of the active material layer 6 of the positive electrode 1 contains two kinds of conductive fillers. In the following a process for producing the positive electrode and a process for producing the negative electrode used in Example 7 are described.

Process for Preparing Positive Electrode:

A mixture of carbon black and tungsten carbide (at a mixing ratio of, for example, 75 parts by weight: 25 parts by weight) was used as a conductive filler. Pellets containing the conductive filler and a resin (polyethylene in this example) were used as an electron conductive material.

The above-described electron conductive material was pulverized by a jet mill method to prepare fine particles. Six parts by weight of the fine particles of the electron conductive material, 91 parts by weight of a positive electrode active material (e.g., $LiCoO_2$), and 3 parts by weight of a binder (e.g., PVDF) were dispersed in NMP, a dispersing medium, to prepare a positive electrode active material paste. A positive electrode was prepared in the same manner as in Example 1 except for using the above prepared paste.

A negative electrode was prepared in the same manner as in Example 1.

The resulting electrode and a battery prepared by using the electrode were tested to confirm their performance. FIG. 14 is a table showing the characteristics of the electrode and the battery containing the electrode, specifically the volume resistivity of the electrode, the flexibility of the electrode, and the short-circuit current of the battery having the electrode. In the Figure, circles indicate considerably good flexibility of the electrode, and triangles indicate moderately good flexibility of the electrode. As can be seen from the Figure, the electrode of Example 7 exhibits a lower volume resistivity in its normal state and higher flexibility than that of Comparative Example 1. It is also seen that the battery having the electrode of Example 7 shows a reduced short-circuit current.

Accordingly, an electrode which has a lower resistivity at temperatures below a prescribed temperature and higher flexibility and is easy to fabricate can be obtained by using an electron conductive material 9 containing at least two kinds of conductive fillers. The electrode provides a battery of high safety because, in case of an external or internal short-circuit accompanied by a rise of the battery temperature, the short-circuit current flowing inside the battery is reduced.

While Example 7 has been described with particular reference to the electron conductive material 9 containing two kinds of conductive fillers, the electron conductive material is not limited thereto. What is important is that the above-mentioned effects can be produced by using an electron conductive material containing a plurality of conductive fillers.

EXAMPLE 8

The electrode of Example 8 is characterized by containing resins of different kinds. Example 8 will be described with particular reference to an embodiment of a positive electrode 1 in which an electron conductive material 9 of an active material layer 6 has two kinds of resins. In the following are explained a process for preparing the positive electrode and a process for preparing the negative electrode used in Example 8.

Process for Preparing Positive Electrode:

A positive electrode was prepared in the same manner as in Example 1, except for making up the electron conductive material by using a mixture of polyethylene and polypropylene in a prescribed ratio (e.g., 75 parts by weight:25 parts by weight) as a resin.

The negative electrode of Example 8 was prepared in the same manner as in Example 1.

The electrode of Example 8 and a battery having the same were tested to confirm their performance. FIG. 15 is a table showing the characteristics of the electrode and a battery containing the electrode, specifically the volume resistivity of the electrode, the flexibility of the electrode, and the short-circuit current of the battery having the electrode. As can be seen from the Figure, the electrode of Example 8 exhibits a lower volume resistivity in its normal state than that of Comparative Example 1. It is also seen that the battery having the electrode of Example 8 shows a reduced short-circuit current.

Accordingly, an electrode which has a lower resistivity at temperatures below a prescribed temperature can be obtained by using an electron conductive material 9 containing at least two kinds of resins. The electrode provides a battery of high safety because, in case an external or internal short-circuit should occur to increase the battery temperature, the short-circuit current flowing inside the battery is reduced.

While Example 8 has been described with particular reference to the electron conductive material 9 containing two kinds of resins, the electron conductive material is not limited thereto. The above-mentioned effects can be produced by using an electron conductive material 9 containing a plurality of resins.

As long as at least one of these resins has a melting point between 90° and 160° C., the PTC function is activated within this temperature range. Accordingly, the melting point of the other resin(s) may be out of this range.

The temperature at which the PTC function is manifested can be set freely by varying the mixing ratio of a plurality of resins.

EXAMPLE 9

The electrode of Example 9 is characterized by containing a manganese-containing oxide as an active material. Example 9 is characterized in that the positive electrode 1 is prepared by using $LiMn_2O_4$ as an active material 8 and that a battery was assembled by using the positive electrode 1 thus prepared. The process for preparing the positive electrode of Example 9 is the same as in Example 1, except for using $LiMn_2O_4$ as an active material.

The negative electrode of Example 9 was prepared in the same manner as in Example 1.

A short-circuit test was carried out to confirm the performance of the electrode and the battery of Example 9. FIG. 16 is a table showing the short-circuit current of the battery having the electrode of Example 1 and that of the battery having the electrode of Example 9. As is shown in the Figure, it is seen that the short-circuit current of the battery using $LiMn_2O_4$ as an active material (positive electrode active material 8) is equal to that of Example 1. Accordingly, the electrode of Example 9 provides a battery of high safety which reduces a short-circuit current flowing inside the battery in case an external or internal short-circuit should occur to increase the battery temperature.

EXAMPLE 10

The electrode of Example 10 is characterized in that an iron-containing oxide is used as an active material. Example 10 is characterized in that the positive electrode is prepared by using $Fe_2(SO_4)_3$ as an active material and that a battery was assembled by using the resulting positive electrode. The process for preparing the positive electrode of Example 10 is the same as in Example 1, except for using $Fe_2(SO_4)_3$ as an active material.

The negative electrode of Example 10 was prepared in the same manner as in Example 1.

A short-circuit test was carried out to confirm the performance of the electrode of Example 10 and the battery having the electrode. FIG. 17 is a table showing the short-circuit current of the battery having the electrode of Example 1 and that of the battery having the electrode of Example 10. As is shown in the Figure, it is seen that the short-circuit current of the battery using $Fe_2(SO_4)_3$ as an active material (positive electrode active material 8) is equal to that of Example 1. Accordingly, the electrode of Example 10 provides a battery of high safety which reduces a short-circuit current flowing inside the battery in case an external or internal short-circuit should occur to increase the battery temperature.

EXAMPLE 11

Figure 18:
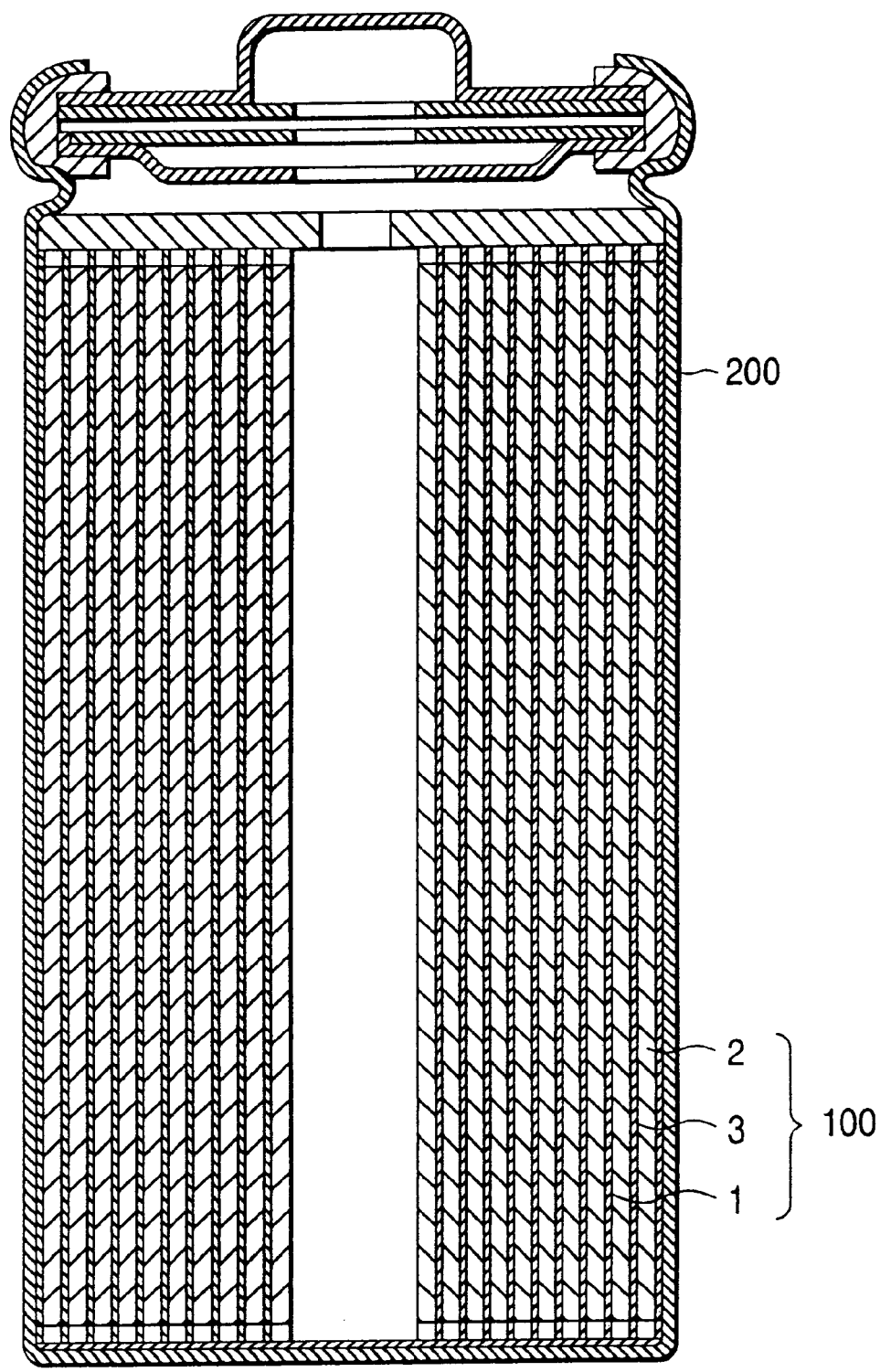
FIG. 18 is a view showing an example of cylindrical batteries.

FIG. 18 is a view showing an example of application of the above-described electrodes and batteries to a lithium ion secondary battery. More specifically, FIG. 18 is a cross-sectional view showing the structure of a cylindrical lithium ion secondary battery.

In the Figure, numeral 200 is an outer case made of, e.g., stainless steel which also serves as a negative electrode terminal, and numeral 100 is a battery body put in the outer case 200. The battery body 100 is made up of a roll of a positive electrode 1, a separator 3, and a negative electrode 2. The positive electrode 1 of the battery body 100 has the structure of the above-described positive electrodes.

According to this structure, the positive electrode 1 (especially the active material layer) increases its own resistivity to reduce the current flowing inside the battery in case the current should increase due to an external or internal short-circuit to raise the battery or electrode temperature above a certain point. The battery assembled by using the electrode has markedly improved safety. The safety of the battery is guaranteed even in case of abnormalities, such as a short-circuit under strict conditions, a back charge, and an overcharge.

While the invention has been described with particular reference to batteries in which the positive electrode 1 increases its resistivity with increasing temperature, it is possible to obtain similar effects by designing the negative electrode 2 to increase its resistivity with increasing temperature, which can be achieved by incorporating an electron conductive material containing a resin and a conductive filler into the negative electrode 2 (especially the active material layer thereof).

The electrodes described in the foregoing Examples are applicable to not only lithium ion secondary batteries of organic electrolytic solution type, solid electrolyte type or gel electrolyte type but primary batteries, such as a lithium-manganese dioxide battery, and other secondary batteries. The electrodes are also effective in primary and secondary batteries of aqueous solution type. The shape of batteries is no object, and the electrodes are applicable to primary and secondary batteries of laminated type, rolled type, button type, and the like.

The electrode and the battery according the invention are applicable to not only lithium ion secondary batteries of organic electrolytic solution type, solid electrolyte type or gel electrolyte type but primary batteries, such as a lithium-manganese dioxide battery, and other secondary batteries. The electrodes are also effective in primary and secondary batteries of aqueous solution type. The shape of batteries is no object, and the electrodes are applicable to primary and secondary batteries of laminated type, rolled type, button type, and the like.

What is claimed is:

1. An electrode comprising:

an electrode active material layer including an active material and an electron conductive material in contact with the active material, wherein said electron conductive material comprises a conductive filler and a resin and is configured to increase an electron conductive material resistivity with increasing temperature to an extent sufficient to substantially reduce a short circuit current flowing through said electrode active material layer.

2. An electrode according to claim 1, wherein the resin of the electron conductive material has a melting point of 90 to 160° C.

3. An electrode according to claim 1, wherein said electrode active material layer comprises 0.5 to 15 parts by weight of the electron conductive material.

4. An electrode according to claim 1, wherein the electron conductive material comprises a 40 to 70 parts by weight conductive filler.

5. An electrode according to claim 1, wherein the electron conductive material comprises particles with a particle size of 0.05 to 100 μm.

6. An electrode according to claim 1, wherein the conductive filler comprises a carbon material or a conductive non-oxide.

7. An electrode according to claim 1, wherein said electrode active material layer further comprises a conducting agent configured to increase an electron conductivity of said electrode active material layer while maintaining a substantially constant conducting agent resistivity with increasing temperature.

8. An electrode according to claim 1, wherein said electrode active material layer comprises at least two different electron conductive materials.

9. An electrode according to claim 1, wherein the electron conductive material comprises at least two different conductive fillers.

10. An electrode according to claim 1, wherein the electron conductive material comprises at least two different resins.

11. An electrode according to claim 1, wherein the active material comprises a cobalt-containing oxide.

12. An electrode according to claim 1, wherein the active material comprises a manganese-containing oxide.

13. An electrode according to claim 1, wherein the active material comprises an iron-containing oxide.

14. An electrode according to claim 1, wherein the resin comprises a crystalline resin.

15. A battery comprising:

a positive electrode;

a negative electrode; and an electrolytic solution provided between said positive and negative electrodes, wherein said positive or negative electrode comprises an electrode according to claim 1.

16. An electrode according to claim 1, wherein the electron conductive material comprises a 50 to 68 parts by weight conductive filler.

17. An electrode according to claim 1, wherein the electrode active material layer comprises a 40 to 70 parts by weight conductive filler.

* * * * *